United States Patent
Tumula et al.

(10) Patent No.: US 11,171,707 B2
(45) Date of Patent: Nov. 9, 2021

(54) INDICATING BEAMS FOR WIRELESS COMMUNICATION

(71) Applicant: Huawei Technologies Co., Ltd., Shenzhen (CN)

(72) Inventors: Chaitanya Tumula, Kista (SE); Wenquan Hu, Lund (SE); Neng Wang, Kista (SE); Bengt Lindoff, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/785,205

(22) Filed: Feb. 7, 2020

(65) Prior Publication Data
US 2020/0177264 A1 Jun. 4, 2020

Related U.S. Application Data

(63) Continuation of application No. PCT/EP2017/070143, filed on Aug. 9, 2017.

(51) Int. Cl.
*H04B 7/06* (2006.01)
*H04B 7/08* (2006.01)

(52) U.S. Cl.
CPC .......... *H04B 7/0695* (2013.01); *H04B 7/063* (2013.01); *H04B 7/088* (2013.01)

(58) Field of Classification Search
CPC . H04W 72/046; H04W 72/042; H04W 24/10; H04B 7/0695; H04B 7/088
See application file for complete search history.

(56) References Cited

U.S. PATENT DOCUMENTS

| 10,644,767 B2* | 5/2020 | Gao | H04B 7/0456 |
| 2013/0223487 A1* | 8/2013 | Zhou | H04B 7/0695 |
| | | | 375/219 |

(Continued)

FOREIGN PATENT DOCUMENTS

| CN | 104620551 A | | 5/2015 | |
| CN | 108462519 A | * | 8/2018 | .......... H04B 7/0456 |
| WO | 2013109059 A1 | | 7/2013 | |

OTHER PUBLICATIONS

"3rd Generation Partnership Project; Technical Specification Group Radio Access Network; Evolved Universal Terrestrial Radio Access (E-UTRA); Physical layer procedures (Release 13)," 3GPP TS 36.213 V13.4.0, pp. 1-387, 3rd Generation Partnership Project, Valbonne, France (Dec. 2016).

(Continued)

*Primary Examiner* — Sophia Vlahos
(74) *Attorney, Agent, or Firm* — Leydig, Voit & Mayer, Ltd.

(57) ABSTRACT

According to a first aspect, a client device is configured to: transmit a beam report, for example to a network device, wherein the beam report comprises information about a set of N transmit, Tx, beams in a downlink and measurement values related to the N Tx beams; obtain information about selected K Tx beams being a subset of the set of N Tx beams; obtain mapping information between K indicators and the selected K Tx beams, wherein each of the K indicator identifies one of the selected K Tx beams; and receive, for example from the network device, a downlink, DL, signal using the obtained information about the selected K Tx beams and the mapping information. According to another aspect a network device is provided. According to another aspects methods of operating the devices are provided and a computer program.

15 Claims, 8 Drawing Sheets

(56) References Cited

U.S. PATENT DOCUMENTS

| | | | |
|---|---|---|---|
| 2013/0235742 A1 | 9/2013 | Josiam et al. | |
| 2013/0286960 A1 | 10/2013 | Li et al. | |
| 2016/0142189 A1* | 5/2016 | Shin | H04L 5/0048 |
| | | | 370/329 |
| 2017/0048037 A1* | 2/2017 | Yen | H04B 7/0695 |
| 2017/0141825 A1* | 5/2017 | Zhang | H04B 7/0626 |
| 2018/0048375 A1* | 2/2018 | Guo | H04B 7/024 |
| 2018/0205585 A1* | 7/2018 | Sadiq | H04L 27/2613 |
| 2018/0323858 A1* | 11/2018 | Bergstrom | H04B 7/0857 |
| 2019/0045494 A1* | 2/2019 | Ho | H04W 72/042 |
| 2019/0281534 A1* | 9/2019 | Yu | H04B 7/0617 |
| 2019/0357274 A1* | 11/2019 | Lee | H04B 7/0695 |

OTHER PUBLICATIONS

"3rd Generation Partnership Project; Technical Specification Group Radio Access Network; NR; Radio Resource Control (RRC); Protocol specification (Release 15)," 3GPP TS 38.331 V0.0.4, pp. 1-22, 3rd Generation Partnership Project, Valbonne, France (Jun. 2017).

"3rd Generation Partnership Project; Technical Specification Group Radio Access Network; NR; Multiplexing and channel coding (Release 15)," 3GPP TS 38.212 V0.0.0, pp. 1-10, 3rd Generation Partnership Project, Valbonne, France (May 2017).

"Beam management for NR," 3GPP TSG-RAN WG1 #89AH, Qingdao, P.R. China, R1-1711160, pp. 1-12, 3rd Generation Partnership Project, Valbonne, France (Jun. 27-30, 2017).

CN/201780093809.5, Office Action/Search Report, dated Jan. 12, 2021.

* cited by examiner

1

| Tx Beam ID | UE Rx beam |
|---|---|
| Tx_A | Rx_A |
| Tx_B | Rx_B |
| Tx_C | Rx_C |
| Tx_D | Rx_D |
| Tx_E | Rx_A |
| Tx_F | RX_F |

| Tx Beam ID | RSRP |
|---|---|
| Tx_C | -90 dBm |
| Tx_D | - 92 dBm |
| Tx_A | -95 dBm |
| Tx_B | -97 dBm |
| Tx_E | -100 dBm |
| Tx_F | -102 dBm |

| Selected beams bit pattern | Signaled information |
|---|---|
| 111001 | 0000 |
| 111010 | 0001 |
| 111100 | 0010 |
| 101110 | 0011 |
| 101101 | 0100 |
| 101011 | 0101 |
| 100111 | 0110 |
| 110011 | 0111 |
| 110101 | 1000 |
| 110110 | 1001 |
| 001111 | 1010 |
| 010111 | 1011 |
| 011011 | 1100 |
| 011101 | 1101 |
| 011110 | 1110 |

FIG. 8

INDICATING BEAMS FOR WIRELESS COMMUNICATION

CROSS-REFERENCE TO RELATED APPLICATIONS

This application is a continuation of International Application No. PCT/EP2017/070143, filed on Aug. 9, 2017, the disclosure of which is hereby incorporated by reference in its entirety.

TECHNICAL FIELD

The present application relates to a field of wireless radio communications, and more particularly to indicating beams for the wireless radio communication.

BACKGROUND

Traditionally, frequencies below 6 GHz are used for mobile communication. However, frequency spectrum suitable for mobile communication is scarce, and there is a need for finding more frequency spectrum for supporting the exponentially growing data usage in mobile networks. One way to address this problem is utilizing the frequencies above 6 GHz. In the new radio, NR, systems that are being currently standardized, carrier frequencies larger than 6 GHz may be used for communication between a network device such as a base station (also known as generalized NodeB, gNB) and a client device such as a user equipment, UE.

Due to the severity of pathloss, for example at frequencies above 6 GHz, the network device and the client device may be equipped with a large number of antennas, and beamformed transmissions may be used to overcome the loss of signal strength due to fading. To maximize the beamforming gain, and to overcome the pathloss, the transmissions from the network device to the client device happen using beams, for example narrow beams. However, indication of beams is required in order to identify used beams and to determine appropriate reception for the used beam. An improved concept for indicating used beams is to be provided.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

It is an object to provide indication of beams for wireless communication. The object is achieved by the features of the independent claims. Further implementation forms are provided in the dependent claims, the description and the figures.

According to a first aspect, a client device is configured to: transmit a beam report, for example to a network device (such as a base station as for example an eNodeB or gNodeB), wherein the beam report comprises information about a set of N transmit, Tx, beams in a downlink and measurement values related to the N Tx beams; obtain information about selected K Tx beams being a subset of the set of N Tx beams; obtain mapping information between K indicators and the selected K Tx beams, wherein each of the K indicator identifies one of the selected K Tx beams; and receive, for example from the network device, a downlink, DL, signal using the obtained information about the selected K Tx beams and the mapping information. Complexity may be reduced at the client device in terms of selecting Rx beamformer for receiving the DL signal. For example, time and power required to identify the best Rx beamformer, which is associated with the DL signals sent to the client device using the selected K Tx beams, may be reduced. According to an embodiment, one measurement value may be related to one Tx beam such as there may be N measurement values.

In a further implementation form of the first aspect, the client device is configured to obtain the information about the selected K Tx beams by receiving such information about the selected K Tx beams through Layer 1, L1 or higher layer signaling. A receiver of the client device may be configured to obtain the selected K Tx beams out of the N Tx beams by receiving information about the selected K Tx beams through L1 or higher layer signaling. The L1 or higher layer signaling to signal the selected K Tx beams may be specified in a standard.

In a further implementation form of the first aspect, the received information about the selected K Tx beams comprises an N bit indication in which a selected Tx beam is assigned a value 1 and a non-selected Tx beam is assigned a value 0, or vice versa. This implementation form may provide a way of obtaining information related to the selected K Tx beams in an explicit manner. This way of obtaining information about the selected K Tx beams does not involve additional, or even any, computations at the client device.

In a further implementation form of the first aspect, the received information about the selected K Tx beams comprises a $$\left\lceil \log_2 \binom{N}{K} \right\rceil$$

bit indication, and the $$\left\lceil \log_2 \binom{N}{K} \right\rceil$$

bit indication corresponds to a combinatorial index of the selected K Tx beams where $\lceil \cdot \rceil$ denotes the ceiling operation to the nearest integer. This implementation form may provide an efficient way of obtaining information related to the selected K Tx beams in an explicit manner. This way of obtaining information about the selected K Tx beams may use efficient signaling to reduce the number of bits to be received over the control channel.

In a further implementation form of the first aspect, the client device is configured to, in case N is equal to K, obtain the information that all the N Tx beams are selected according to a predefined rule. Such predefined rule may for example be specified in a standard. If the client device reports N beams, where N>K, signaling of the selected K beams may be used. However, if the client device reports N equaling to K beams, no signaling may be required. Communication resources may be saved.

In a further implementation form of the first aspect, the client device is configured to obtain the mapping information based on a predefined ordering of the transmitted measurement values related to the selected K Tx beams. The predefined ordering may be defined by a standard. Using this implementation form, the client device may obtain the mapping information of the selected K Tx beams implicitly. This may result in saving the control channel resources.

In a further implementation form of the first aspect, the client device is configured to receive the mapping information through layer 1 or higher layer signaling e.g. from the network device. Using this implementation form, the client device may obtain the mapping information of the selected K Tx beams in an explicit manner.

According to a second aspect, a network device is configured to: receive a beam report, wherein the beam report comprises information related to a set of N transmit, Tx, beams in a downlink and measurement values related to the N Tx beams; select K Tx beams being a subset of the set of N Tx beams based on the received beam report; map the selected K Tx beams to K indicators, wherein each of the indicator identifies one of the selected K Tx beams; convey information about the selected K Tx beams and/or the K indicators; and transmit a downlink signal using at least one of the selected K Tx beams, and indicating the at least one of the selected K Tx beams using at least one corresponding indicator. Information about the selected K Tx beams may be conducted without specifically conveying the K indicators. Alternatively, information about the selected K Tx beams and the K indicators may be both conveyed. Due to the second aspect, complexity may be reduced at the client device in terms of selecting Rx beamformer for receiving the DL signal from the network device. For example, time and power required to identify the best Rx beamformer, which is associated with the DL signals sent to the client device using the selected Tx beams, may be reduced.

In a further implementation form of the second aspect, the network device is configured to signal the selected K Tx beams out of the N Tx beams using N bits through L1 or higher layer signaling, wherein a selected Tx beam is assigned a value 1 and a non-selected beam is assigned a value 0, or vice versa. This implementation form may provide a way of conveying information related to selected K Tx beams in an explicit manner. This way of conveying information about the selected K Tx beams may not involve computations at the client device. The L1 or higher layer signaling to signal the selected K Tx beams may be specified in a standard.

In a further implementation form of the second aspect, the network device is configured to signal a combination of the selected K Tx beams using $$\left\lceil \log_2 \binom{N}{K} \right\rceil$$

bits through L1 or higher layer signaling. This implementation form may provide another way of conveying information related to selected K Tx beams in an explicit manner. This way of conveying information about the selected K Tx beams minimizes the number of bits required to signal the information about the selected K Tx beams to the client device. The L1 or higher layer signaling to signal the combination corresponding to the selected K Tx beams may be specified in a standard.

In a further implementation form of the second aspect, the network device is configured to signal the mapping information. The mapping information may be sent to the client device in an explicit manner. In addition to the selected K Tx beams information, by receiving the mapping information from the network device, the client device may easily select the best Rx beam to receive with transmitted downlink signals.

In a further implementation form of the second aspect, the network device is configured to determine the mapping information based on a predefined ordering of the received measurement values related to the selected K Tx beams. The predefined ordering may be defined in a standard. Using this implementation form, a network device may omit signaling the mapping information. The mapping information may be obtained implicitly from the predefined order of the measurement values and the selected K Tx beams. This may result in saving of the control channel resources.

In a further implementation form of the second aspect, the K indicators associated with the selected K Tx beams are signaled only if K<N. If the client device reports N beams, where N>K, signaling of the selected K beams may be used. However, if the client device reports N equaling to K beams, no signaling may be required. In this case, control channel resources may be saved.

In a further implementation form of the second aspect, the information about the K indicators is signaled using L1 or higher layer signaling. The L1 or higher layer signaling to signal the K indicators may be specified in a standard.

According to a third aspect, a method comprises: transmitting a beam report, wherein the beam report comprises information about a set of N transmit, Tx, beams in a downlink and measurement values related to the N Tx beams; obtaining information about selected K Tx beams being a subset of the set of N Tx beams; obtaining mapping information between K indicators and the selected K Tx beams, wherein each of the K indicator identifies one of the selected K Tx beams; receiving a downlink signal using the obtained information about the selected K Tx beams and the mapping information.

According to a fourth aspect, a method comprises: receiving a beam report, wherein the beam report comprises information related to a set of N transmit, Tx, beams in a downlink and measurement values related to the N Tx beams; selecting K Tx beams being a subset of the set of N Tx beams based on the received beam report; mapping the selected K Tx beams to K indicators, wherein each of the indicator identifies one of the selected K Tx beams; conveying information about the selected K Tx beams and/or the K indicators; and transmitting a downlink signal using at least one of the selected K Tx beams, and indicating the at least one of the selected K Tx beams using at least one corresponding indicator.

According to a fifth aspect, a computer program is provided, comprising program code configured to perform a method according to the third or fourth aspect when the computer program is executed on a computer.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein:

FIG. 2 illustrates an example of a schematic representation of a table, which comprises Rx beam association for the Tx beams reported in a beam report, and which is configured for an embodiment;

FIG. 3 illustrates an example of a schematic representation of table comprising a beam report, which is sent from a client device to a network device, and which is configured for an embodiment;

FIG. 8 illustrates a schematic representation of a table comprising mapping of selected Tx beams combination, and signaling information from the network device to the client device according to an embodiment;

Like references are used to designate like parts in the accompanying drawings.

DETAILED DESCRIPTION

The detailed description provided below in connection with the appended drawings is intended as a description of the embodiments and is not intended to represent the only forms in which the embodiment may be constructed or utilized. However, the same or equivalent functions and structures may be accomplished by different embodiments.

Figure 1:
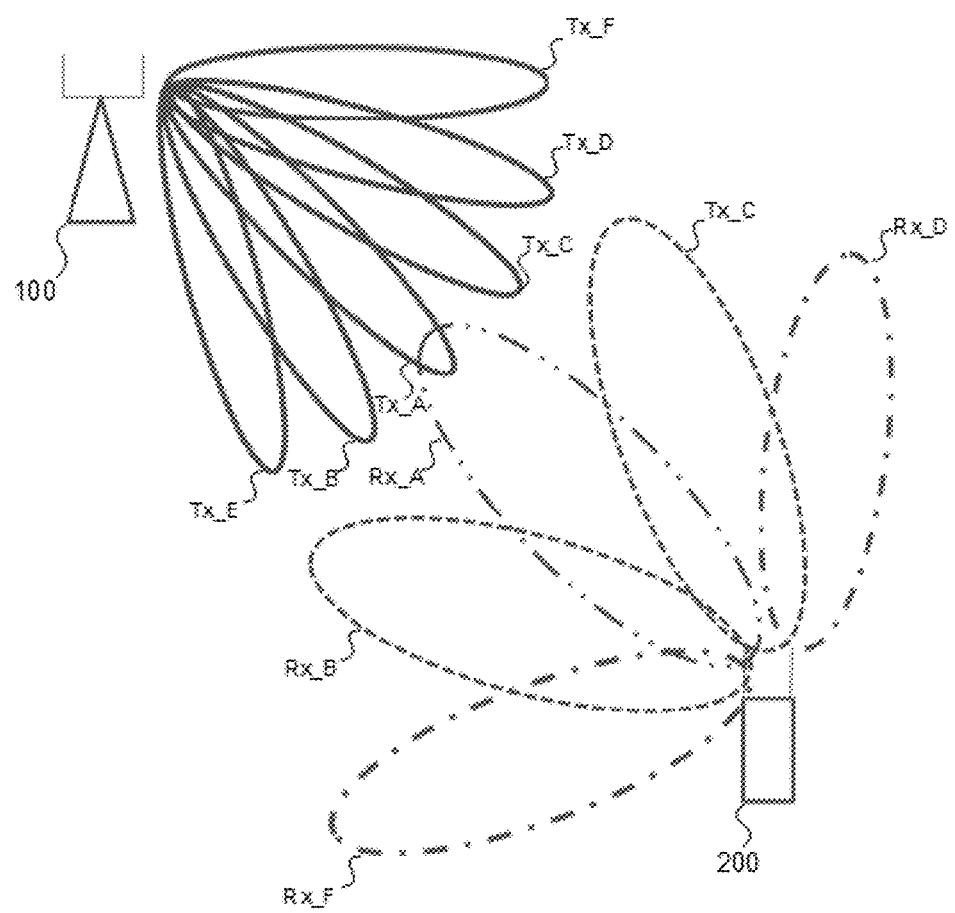
FIG. 1 illustrates an example of a schematic representation of a system comprising Tx beams at a network device and Rx beams at a client device that is configured for an embodiment.

During an initial phase, a network device 100 sends a set of downlink, DL, signals using different transmit, Tx, beams to the client device 200 as shown in the example of FIG. 1 illustrating a configuration of Tx beams and Rx beams for an embodiment. For example, let us assume that the available Tx beams at the network device 100 of FIG. 1 be denoted by the set {Tx_A, Tx_B, Tx_C, Tx_D, Tx_E, Tx_F}. The DL signals could be signals associated with sync signal, SS, blocks or channel state information, CSI, related reference signals, RS.

The signals transmitted from the network device 100 can be used by the client device 200 to identify the best receive, Rx, beams associated with each of the Tx beams. The network device 100 sends the same DL signal, for example, SS blocks using different Tx beams, and repeats the same pattern with a certain pre-defined interval.

The client device 200 typically uses a beam sweep of Rx beams of the client device 200 to receive DL signal transmitted by the network device 100 using a specific Tx beam. The Rx beam sweep associated with a given Tx beam is performed by using different Rx beams at different times to receive the signal transmitted with the same Tx beam. Let the Rx beams available at the client device 200 be denoted by {Rx_A, Rx_B, Rx_C, Rx_D, Rx_F}. For example, for the SS blocks transmitted with Tx beam with index Tx_A, the client device 200 can use all of its Rx beams Rx_A, Rx_B, Rx_C, Rx_D, and Rx_F in a sequential manner to receive the signals and make a measurement for each combination of Tx and Rx beam pairs. This measurement for example can be reference signal received power, RSRP, or reference signal received quality, RSRQ, or some channel state information, CSI, related metric. This process is repeated for each Tx and Rx beam pairs. Based on the measurements for each Tx-Rx beam pairs, the client device 200 identifies the best Rx beam for each Tx beam. An example of Tx and Rx beam pair association is shown in a table 1 of FIG. 2 illustrating a configuration for an embodiment.

Next, the client device 200 sends a beam report comprising the Tx beam ID and the corresponding measurement value, for example the RSRP measured with the best Rx beam associated with the Tx beam as shown in an example of a table 2 of FIG. 3 illustrating a beam report configured to an embodiment. The Tx beam ID can be a CSI-RS resource ID (CSR), antenna port index, and/or a combination of antenna port index and a time index.

In general, the network device 100 may transmit the DL signals with T Tx beams and the client device 200 may send a beam report with information related to N Tx beams. In the example described above, T=N=6. However, the values of T and N can be different. The network device 100 may configure the number of beams N to be reported by the client device 200.

Once the network device 100 receives a beam report, it selects a certain number K of the client device reported beams for sending data, control information, and additional CSI-RS resources for monitoring the selected beams. Typically, the value of K is known to both the network device 100 and the client device 200, for example, through the radio resource control, RRC setup.

According to an embodiment, a client device 200 transmits a beam report to a network device 100. The beam report comprises information about a set of Tx beams available for downlink communication. The beam report has also measurement values of the available Tx beams for the communication. The client device 200 obtains information about selected Tx beams from the set of available Tx beams. Additionally, the client device 200 obtains mapping information. The mapping information configures a relation between the selected Tx beams and their respective Rx beams at the client device 200. The client device 200 may use the mapping information to establish respective Rx beams for the selected Tx beams. The client device 200 receives the downlink signals using the obtained information about the selected Tx beams, and further may use the obtained mapping information to select the Rx beams accordingly.

According to another embodiment, a network device 100 receives the beam report from the client device 200. Based on the beam report, the network device 100 selects a certain number of Tx beams from available Tx beams. The network device 100 maps the selected Tx beams to respective indicators. Each of the indicators can uniquely identify a certain selected Tx beam. The network device 100 may convey information about the selected Tx beams to the client device 200. The mapped indicators may be conveyed, for example by transmitting them explicitly or alternatively using a mapping rule based on predefined ordering of the selected Tx beams. With the predefined ordering of the selected Tx beams, a certain order may consequently uniquely identify the selected Tx beams without specifically sending the mapping information. The network device 100 transmits the downlink signals using the selected Tx beams. The downlink transmission further uses the conveyed mapped indictors corresponding to the transmitted Tx beams.

An embodiment signals mapping information, which is associated with the selected Tx beams from the reported beams. This signaling reduces the complexity at the client device 200 in terms of selecting the Rx beamformer for receiving a DL signal. Power and latency to identify the best Rx beamformer, associated with the selected Tx beams, may be reduced. Consequently, the client device 200 may save processing power and reduce energy consumption. Furthermore the client device 200 may save time when determining appropriate Rx beams to receive the downlink signal.

Figure 4:
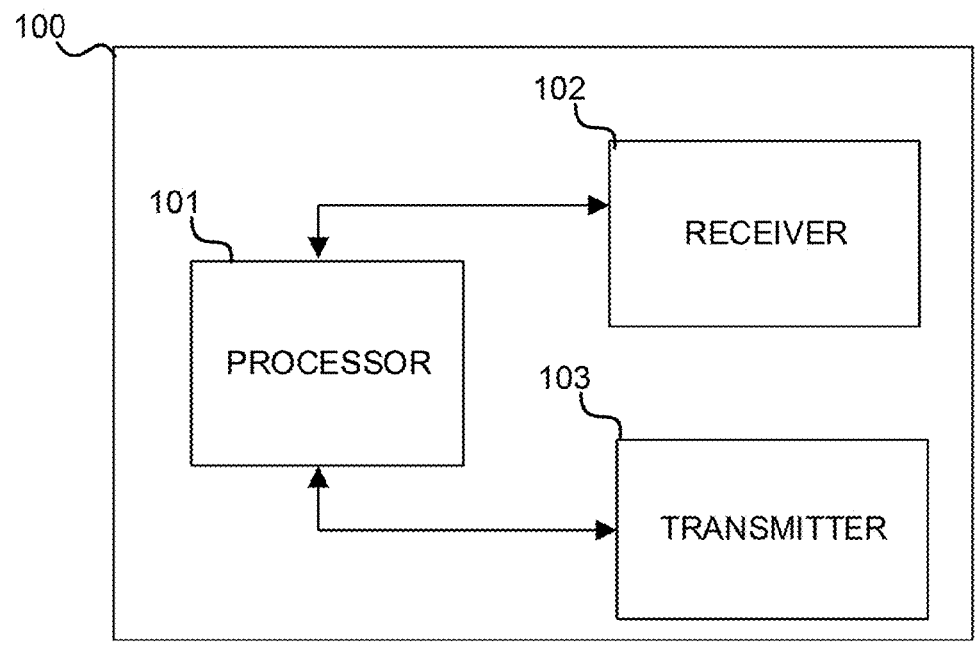
FIG. 4 illustrates a schematic representation of a block diagram of a network device according to an embodiment.
Figure 5:
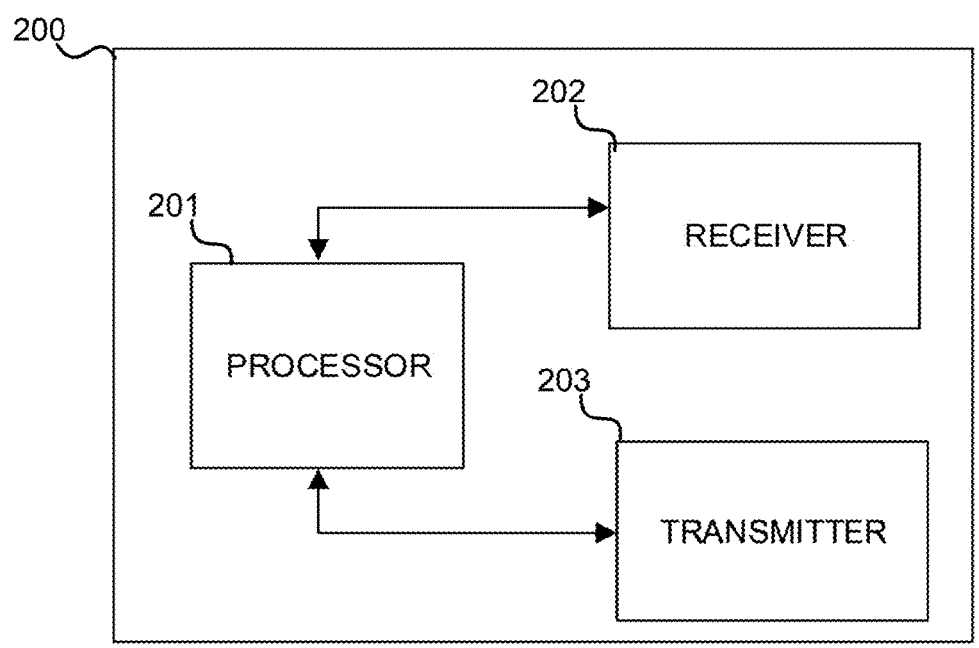
FIG. 5 illustrates a schematic representation of a block diagram of a client device according to an embodiment.

FIGS. 4 and 5 schematically show a network device 100, such as a general NodeB, gNB, in a wireless communication system. The network device 100 comprises a processor 101, a receiver 102 and a transmitter 103. The network device 100 may be accordingly configured to perform the operations and functions of the embodiments. The wireless communication system also comprises a client device 200 such as user equipment UE, which may also comprise a processor 201, a receiver 202 and a transmitter 203. Consequently, the client device 200 may be configured to perform the operations and functions of the embodiments.

The client device 200 may be any of a User Equipment (UE) in Long Term Evolution (LTE) or New Radio (NR), mobile station (MS), wireless terminal or mobile terminal which is enabled to communicate wirelessly in a wireless communication system, sometimes also referred to as a cellular radio system. The UE may further be referred to as mobile telephones, cellular telephones, computer tablets or laptops with wireless capability. The UEs in the present context may be, for example, portable, pocket-storable, hand-held, computer-comprised, or vehicle-mounted mobile devices, enabled to communicate voice or data, via a radio access network, with another entity, such as another receiver or a server. The UE can be a Station (STA) which is any device that contains an IEEE 802.11-conformant Media Access Control (MAC) and Physical Layer (PHY) interface to the Wireless Medium (WM).

The network device 100 may be a transmission or reception point, TRP or a 5G base station gNodeB, gNB. The network device 100 may be a base station, a (radio) network node or an access node or an access point or a base station, e.g., a Radio Base Station (RBS), which in some networks may be referred to as a transmitter, "eNB", "eNodeB", "NodeB" or "B node", depending on the technology and terminology used. The radio network nodes may be of different classes such as, e.g., macro eNodeB, home eNodeB or pico base station, based on transmission power and thereby also cell size. The radio network node can be a Station (STA) which is any device that contains an IEEE 802.11-conformant Media Access Control (MAC) and Physical Layer (PHY) interface to the Wireless Medium (WM).

According to an embodiment, the network device 100 may signal the selected Tx beams. The network device 100 also maps the selected Tx beams to indicators. In addition to or alternatively to the selected Tx beams information, the mapping of the selected Tx beams to the indicators may be conveyed to the client device 200. The mapping may be performed implicitly by using predefined mapping rules or by an explicit signaling. Consequently, after receiving the beam report, the network device 100 may send the information related to the selected Tx beams used for downlink transmission to the client device 200. This may be performed by signaling the selected Tx beams based on the received beam report. The network device 100 may also signal information regarding the mapping of the selected Tx beams to the respective indicators, which can be used to distinguish selected Tx beams at the client device 200.

Figure 6:
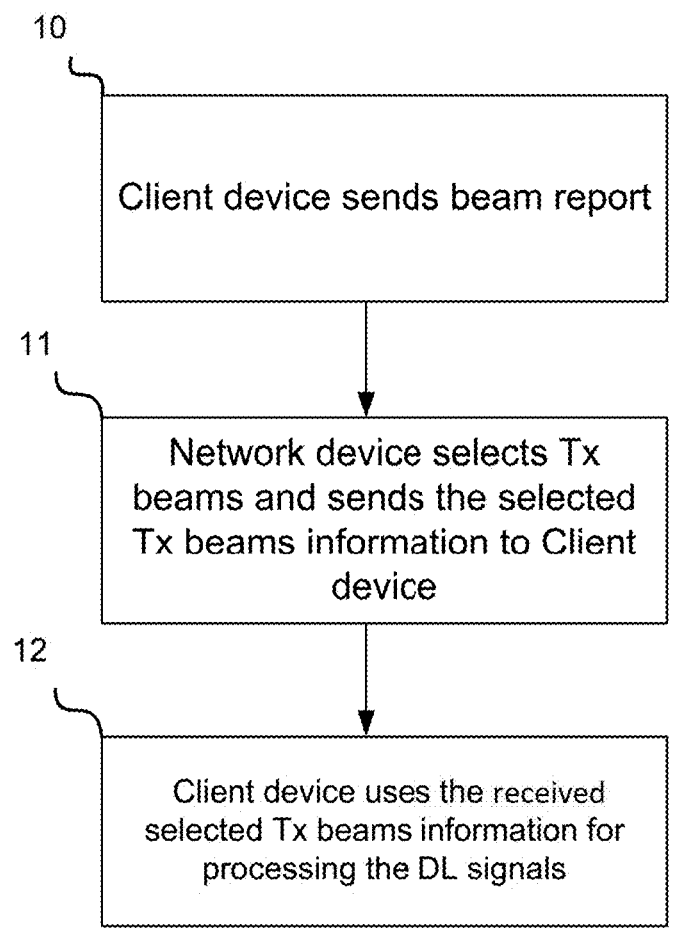
FIG. 6 illustrates a flowchart showing a method of signaling of selected Tx beams with identifying information, according to an embodiment.

Referring to the FIG. 6, a schematic representation of a flowchart of using selected Tx beams is illustrated according to an embodiment. The network device 100 and the client device 200 of the embodiments of FIGS. 4 and 5 may be configured to the operations of the method of FIG. 6. In operation 10, a client device 200 may send a beam report. For example the beam report of table 2 of FIG. 3 can be sent. In operation 11 after receiving a beam report, the network device 100 may send information about the selected Tx beams used for transmission. This signaling mechanism allows the client device 200 to process the received signals using the signaled information. In an embodiment, the network device 100 may send the information about which of the reported Tx beams are selected for transmission of data, control information and CSI-RS. In operation 12, the client device 200 can use the received selected Tx beams information in order to process downlink, DL, signals. For example, to process the DL signals associated with an indicator(s), the client device 200 may use the indicator(s) in order to limit the set of Rx beams it should use to determine the Rx beams, which are associated with the selected Tx beams.

Figure 7:
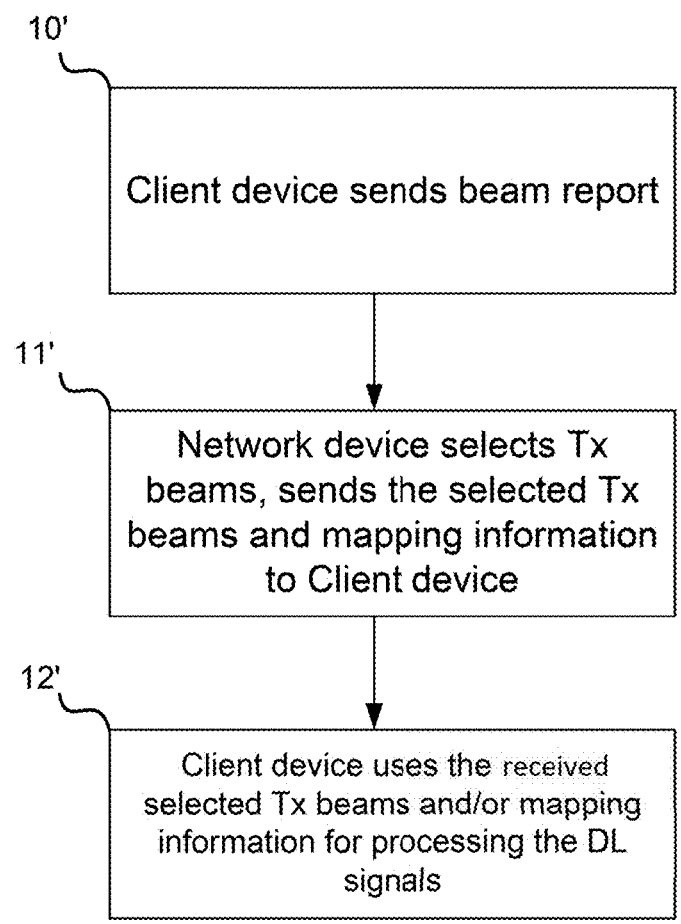
FIG. 7 illustrates a flowchart showing a method of signaling of selected Tx beams with mapping information, according to an embodiment.

Referring to FIG. 7, a schematic representation of a flowchart using mapping information is illustrated according to an embodiment. The network device 100 and the client device 200 of the embodiments of FIGS. 4 and 5 may be configured to the operations of the method of FIG. 7. The mapping information may be sent to the client device 200 in addition to the selected Tx beams information. In operation 10', the client device 200 sends the beam report. For example, this may be the same operation as in operation 10 of FIG. 6. In operation 11', the network device 100 selects Tx beams, and sends the selected Tx beams and the mapping information to the client device 200. For example in addition to the selected Tx beams, the network device 100 can also send information regarding the mapping of selected Tx beams to the indicators. In operation 12', the client device 200 uses the received selected Tx beams and/or the mapping information for processing the DL signals. In this case, to process the DL signals associated with an indicator, the client device 200 may directly select the Rx beam based on the selected Tx beams, based on the mapping of the selected Tx beams to the indicators information and based on the association of the reported Tx beams in the beam report and the corresponding Rx beams shown in table 1 of FIG. 2.

According to an embodiment, after receiving a beam report from the client device 200 with measurement information related to N Tx beams, the network device 100 selects K Tx beams for sending data, control and CSI-RS to the client device 200. For example after receiving a beam report having about 6 Tx beams (Tx_A, Tx_B, Tx_C, TX_D, TX_E, TX_F) as in the table 2 of FIG. 3, the network device 100 can select 4 Tx beams. The number four is merely used as an example value, and the number of the selected beams may vary. These 4 Tx beams for example may be selected based on i) Tx beams measured with the highest reference signal received power, RSRP, values (for example maximizing user throughput), ii) Tx beams that the maximize the system throughput or iii) Tx beams that minimize interference to certain users, etc.

In general, there are $$\binom{N}{K}$$

possible combinations in which the network device 100 can select K Tx beams from the reported N Tx beams in the beam report. The value of K is known both to the network device 100 and the client device 200. The information regarding the selected K Tx beams may be signaled to the client device 200 to assist the selection of Rx beamformer at the client device 200.

According to an embodiment, in the case the client device 200 reports N=K beams, no signaling may be needed from the network device 100 to the client device 200. In this case, all the reported beams can be selected by the network device 100. Generally the embodiments assume that N>K. This means that the number or reported Tx beams is larger than the number of selected Tx beams.

According to an embodiment, signaling of the selected Tx beams can be done in an explicit manner. For signaling the selected Tx beams, a less-efficient signaling scheme may be used. In this embodiment, the network device 100 can use N bits to send information about the K selected Tx beams to the client device 200. If a Tx beam is selected, bit 1 is assigned to that Tx beam. Otherwise bit 0 is assigned to the Tx beam. For the example shown in table 2 of FIG. 3, if the network device 100 selects beams Tx_C, Tx_A, Tx_B, and Tx_E, then the network device 100 may signal the selected Tx beams as (1 0 1 1 0 1), (where first Tx_C=1, second Tx_D=0, third Tx_A=1, fourth Tx_B=1, fifth Tx_E=0, and sixth Tx_E=1). Further, the ordering of bits for signaling may correspond to the same ordering of the reported Tx beams in the beam report.

According to an embodiment, to explicitly signal the selected Tx beams, an efficient signaling may be used. If the reported beams is N, and the number of beams selected by the network device 100 is K, then the possible number of combinations are $$\binom{N}{K} = \frac{N!}{(N-K)!K!}$$

Hence, there may be used $$\left\lceil \log_2 \binom{N}{K} \right\rceil \leq N$$

bits to identify the selected combination, where $\lceil \cdot \rceil$ is a ceiling operation to a nearest integer.

For example, $$\text{if } N = 6 \text{ and } K = 4 \text{ then } \left\lceil \log_2 \binom{N}{K} \right\rceil = 4,$$

which is smaller than the bits required for the less-efficient signaling. According to the embodiment, a combination table as shown in a table 4 of FIG. 8 may be mapped to signal the selected Tx beams information to the client device 200. For example, using this mapping, if Tx_C, Tx_A, Tx_B, and Tx_E are the selected beams, the network device 100 can signal 0100 to the client device 200. The signaled information 0100 indicates that the selected beams pattern is 101101.

According to an embodiment, for explicitly signaling the combination of the selected Tx beams to the client device 200, an alternate efficient signaling based on the LTE subband channel quality indicator, CQI, reporting mechanism may be used. Using this mechanism, a combinatorial index r can be computed as $$r = \sum_{i=0}^{K-1} \binom{N - s_i}{K - i}$$

where the set $\{s_i\}_{i=0}^{K-1}$, $(1 \leq s_i \leq N, s_i < s_{i+1})$ contains the K sorted selected Tx beam indices and $$\binom{x}{y} = \begin{cases} \binom{x}{y} & x \geq y \\ 0 & x < y \end{cases}$$

is the extended binomial coefficient resulting in a unique label.

Further, $$r \in \left\{0, 1, \ldots, \binom{N}{K} - 1\right\}.$$

Using this approach as well, $$\left\lceil \log_2 \binom{N}{K} \right\rceil$$

bits are needed to signal the information about the selected Tx beams to the client device 200.

This embodiment may be described using the following example, suppose that the client device 200 reports the beams T×C, T×D, T×A, T×B, T×E, T×F beams (N=6) and the network device 100 selects Tx_C, Tx_A, Tx_B, and Tx_E (K=4) among the reported beams. In this example, $s_0=1$, $s_1=3$, $s_2=4$ and $s_4=5$.

The combinatorial index r may be computed as $$r = \binom{6-1}{4-0} + \binom{6-3}{4-1} + \binom{6-4}{4-2} + \binom{6-5}{4-3} = 5 + 1 + 1 + 1 = 8$$

Now r=8 can be signaled using bits 1000. This signaling may uniquely identify the selected Tx beams.

After receiving the selected Tx beams information, for example either through the less-efficient signaling or efficient signaling, the client device 200 knows the selected Tx beams. Hence, when the client device 200 receives a DL signal, for example a CSI-RS associated with one of the selected Tx beams (indicated using an indicator), the client device 200 may use the sweeping using Rx beams Rx_A, Rx_B and Rx_C, associated with the selected Tx beams.

Consequently, the client device 200 need not use Rx_D and Rx_F when processing the transmitted CSI-RS.

Figure 9:
FIG. 9 illustrates a schematic representation of a table comprising selected Tx beams and associated indicators illustrating predefined mapping according to an embodiment.

According to an embodiment, the mapping of the selected Tx beams to the identifiers may be an implicit mapping. The mapping can be based on a predefined rule in a standard specification. The standard specification for example may correspond to a 3rd Generation Partnership Project, 3GPP, standard or an Institute of Electrical and Electronics Engineers, IEEE standard, which uses beam based transmission schemes. Such a standard may especially be published after the priority date of the present application and can be subject to continuous development. One example of a predefined rule can be based on the received measurements of the selected Tx beams. An embodiment of the implicit mapping is illustrated in a table 3 of FIG. 9. An example mapping of the selected Tx beams to the indicators, assuming that the number of Tx beams selected by the gNB is K=4, is shown in the table 3 of FIG. 9. This indicator could be a beam tag or a measurement indicator. Then the network device 100 sends DL signals to the client device 200 using these indicators. For example, assuming that the network device 100 selected 4 Tx beams Tx_C, Tx_A, Tx_B, and Tx_E, the mapping of selected Tx beams to the indicators can be based on the reported RSRP values. Since Tx_C is reported with the best RSRP value, it will be assigned the indicator bits 00. Next, since Tx_A has better reported RSRP, it will be assigned bits 01 followed by Tx_B with 10 and finally Tx_E will be assigned bits 11. When the implicit mapping is used, the network device 100 does not need to send any signaling information relating to the mapping of selected Tx beams to indicators to the client device 200. The client device 200 can determine the mapping information implicitly without a specific signaling or a message. The predefined order can indicate the mapping information, and the client device 200 can establish respective indicator to the associated Tx beams accordingly.

Another example of a predefined rule for mapping the selected Tx beams to indicators can be based on natural ordering of the selected Tx beams among the reported Tx beams. For example, assuming that the network device 100 selected 4 Tx beams Tx_C, Tx_A, Tx_B, and Tx_E, the mapping of selected Tx beams to the indicators can be that Tx_A is assigned bits 00, followed by Tx_B with bits 01, Tx_C with bits 10 and finally TX_E with bits 11.

Figure 10:
FIG. 10 illustrates a schematic representation of a table illustrating non-implicit mapping of selected Tx beams and their associated identifiers according to an embodiment.

According to an embodiment, the mapping may be non-implicit as shown in table 5 of FIG. 10. In the non-implicit mapping, the network device 100 can send the mapping of the selected Tx beams with the indicator information to the client device 200.

The mapping information is useful for the client device 200 in selecting the Rx beamformer, which is associated with a certain DL signal indicated through an indicator.

For example, assuming non-implicit mapping as in table 5, if the network device 100 sends a DL CSI-RS resource identified with an indicator 00, the client device 200 can use the mapping information along with the selected Tx beams information and select the Rx beam Rx_A for processing the DL CSI-RS signal.

Assuming implicit mapping as in table 3, if the network device 100 sends a DL CSI-RS resource identified with an indicator 00, the client device 200 can use the mapping information along with the selected Tx beams information and select the Rx beam Rx_C for processing the DL CSI-RS signal.

According to an embodiment, the signaling of the selected Tx beams may be done using L1 or higher layer signaling. Furthermore, the mapping between the selected Tx beams and the indicators may be signaled using L1 or higher layer signaling. According to an embodiment, the higher layer signaling may correspond to signaling through medium access channel-control element (MAC-CE) and/or radio resource control (RRC) signaling. The higher layer signaling may be configured using both MAC-CE and RRC. Alternatively, MAC-CE or RRC is only used for the signaling.

According to an embodiment, when N=K, all the reported beams will be selected by the network device 100. In this embodiment, selected Tx beams information may not be signaled, and the mapping of the Tx beams to the indicators may be signaled to the client device 200 to reduce the complexity associated with selecting the Rx beamformer.

In the above, embodiments have been described assuming a single set of Tx beams and client device 200 reporting the Tx beams from this set. However, the aspects of the embodiment can be extended to a group based beam reporting. In the group based beam reporting, the client device 200 sends a beam report per beam group.

The functionality described herein can be performed, at least in part, by one or more computer program product components such as software components. According to an embodiment, the network device 100 and/or the client device 200 comprise the processor 101, 201 configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

Any range or device value given herein may be extended or altered without losing the effect sought. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items. The term 'and/or' may be used to indicate that one or more of the cases it connects may occur. Both, or more, connected cases may occur, or only either one of the connected cases may occur. For example for signaling selected Tx beams and/or mapping information, at least selected Tx beams and mapping information may be signaled. Selected Tx beams may be signaled without signaling the mapping information. Furthermore, mapping information may be signaled without signaling the selected Tx beams.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

What is claimed is:

1. A client device, comprising a processor configured to:
transmit a beam report to a network device, wherein the beam report comprises information about a set of N transmit (Tx) beams in a downlink and measurement values related to the N Tx beams;
obtain information about a selected K Tx beams of the set of N Tx beams, and K being smaller than or equal to N;
obtain mapping information between K indicators and the selected K Tx beams, wherein each of the K indicators identifies one of the selected K Tx beams; and
receive a downlink signal using the obtained information about the selected K Tx beams and the mapping information,
wherein the obtained information about the selected K Tx beams comprises an N bit indication in which a selected Tx beam is assigned a value 1 and a non-selected Tx beam is assigned a value 0, or a selected Tx beam is assigned a value 0 and a non-selected Tx beam is assigned a value 1, and K is known to both the client device and the network device before the client device transmits the beam report,
wherein the client device is configured to obtain the mapping information based on a predefined ordering of the transmitted measurement values related to the selected K Tx beams, or to receive the mapping information through Layer 1, L1 or higher layer signaling, and
wherein the higher layer signaling is configured to correspond to signaling through medium access channel-control element (MAC-CE) and/or radio resource control (RRC) signaling, or is configured to use both MAC-CE and RRC.

2. The client device of claim 1, configured to obtain the information about the selected K Tx beams by receiving such information about the selected K Tx beams through Layer 1, L1 or higher layer signaling.

3. The client device of claim 2, wherein the received information about the selected K Tx beams comprises a $$\left\lceil \log_2 \binom{N}{K} \right\rceil$$

bit indication, and the $$\left\lceil \log_2 \binom{N}{K} \right\rceil$$

bit indication corresponds to a combinatorial index of the selected K Tx beams where denotes the ceiling operation to the nearest integer.

4. The client device of claim 2, configured to, in response to K being equal to N, obtain the information that all the N Tx beams are selected according to a predefined rule.

5. A network device, comprising a processor configured to:
receive a beam report from a client device, wherein the beam report comprises information related to a set of N transmit (Tx) beams in a downlink and measurement values related to the N Tx beams;
select K Tx beams of the set of the N Tx beams based on the received beam report, and K being smaller than or equal to N;
map the selected K Tx beams to K indicators, wherein each of the indicators identifies one of the selected K Tx beams;
convey information about the selected K Tx beams and/or the K indicators; and
transmit a downlink signal using at least one of the selected K Tx beams, and indicating the at least one of the selected K Tx beams using at least one corresponding indicator,
wherein a selected Tx beam is assigned a value 1 and a non-selected Tx beam is assigned a value 0, or a selected Tx beam is assigned a value 0 and a non-selected Tx beam is assigned a value 1, and K is known to the network device and the client device before the network device receives the beam report,
wherein the network device is configured to determine mapping information of mapping the selected K Tx beams to the K indicators based on a predefined ordering of the received measurement values related to the selected K Tx beams, or to signal information about the K indicators through Layer 1, L1 or higher layer signaling, and
wherein the higher layer signaling is configured to correspond to signaling through medium access channel-control element (MAC-CE) and/or radio resource control (RRC) signaling, or is configured to use both MAC-CE and RRC.

6. The network device of claim 5, wherein the network device is configured to signal the selected K Tx beams out of the N Tx beams using N bits through L1 or higher layer signaling.

7. The network device of claim 5, wherein the network device is configured to signal a combination of the selected K Tx beams using $$\left\lceil \log_2 \binom{N}{K} \right\rceil$$

bits through L1 or higher layer signaling.

8. The network device of claim 5, wherein the network device is configured to signal the mapping information.

9. The network device of claim 5, wherein the K indicators associated with the selected K Tx beams are signaled in response to K being smaller than N.

10. A method, comprising:
transmitting a beam report, wherein the beam report comprises information about a set of N transmit (Tx) beams in a downlink and measurement values related to the N Tx beams;
obtaining information about a selected K Tx beams of the set of the N Tx beams, and K being smaller than or equal to N;
obtaining mapping information between K indicators and the selected K Tx beams, wherein each of the K indicators identifies one of the selected K Tx beams; and
receiving a downlink signal using the obtained information about the selected K Tx beams and the mapping information,
wherein the obtained information about the selected K Tx beams comprises an N bit indication in which a selected Tx beam is assigned a value 1 and a non-selected Tx beam is assigned a value 0, or a selected Tx beam is assigned a value 0 and a non-selected Tx beam is assigned a value 1, and K is known before transmitting the beam report,
wherein the mapping information is obtained based on a predefined ordering of the transmitted measurement values related to the selected K Tx beams, or the mapping information is received through Layer 1, L1 or higher layer signaling, and
wherein the higher layer signaling is configured to correspond to signaling through medium access channel-control element (MAC-CE) and/or radio resource control (RRC) signaling, or is configured to use both MAC-CE and RRC.

11. A method, comprising:
receiving a beam report, wherein the beam report comprises information related to a set of N transmit (Tx) beams in a downlink and measurement values related to the N Tx beams;
selecting K Tx beams of the set of N Tx beams based on the received beam report, and K being smaller than or equal to N;
mapping the selected K Tx beams to K indicators, wherein each of the indicators identifies one of the selected K Tx beams;
conveying information about the selected K Tx beams and/or the K indicators; and
transmitting a downlink signal using at least one of the selected K Tx beams, and indicating the at least one of the selected K Tx beams using at least one corresponding indicator,
wherein a selected Tx beam is assigned a value 1 and a non-selected Tx beam is assigned a value 0, or a selected Tx beam is assigned a value 0 and a non-selected Tx beam is assigned a value 1, and K is known before receiving the beam report,
wherein mapping information of mapping the selected K Tx beams to the K indicators is determined based on a predefined ordering of the received measurement values related to the selected K Tx beams, or to signal information about the K indicators through Layer 1, L1 or higher layer signaling, and
wherein the higher layer signaling is configured to correspond to signaling through medium access channel-control element (MAC-CE) and/or radio resource control (RRC) signaling, or is configured to use both MAC-CE and RRC.

12. A non-transitory computer readable memory comprising computer program code configured to perform a method when the computer program code is executed on a computer, the method comprising:
transmitting a beam report, wherein the beam report comprises information about a set of N transmit (Tx) beams in a downlink and measurement values related to the N Tx beams;
obtaining information about a selected K Tx beams of the set of the N Tx beams, and K being smaller than or equal to N;
obtaining mapping information between K indicators and the selected K Tx beams, wherein each of the K indicators identifies one of the selected K Tx beams; and
receiving a downlink signal using the obtained information about the selected K Tx beams and the mapping information,
wherein the obtained information about the selected K Tx beams comprises an N bit indication in which a selected Tx beam is assigned a value 1 and a non-selected Tx beam is assigned a value 0, or a selected Tx beam is assigned a value 0 and a non-selected Tx beam is assigned a value 1, and K is known before transmitting the beam report,
wherein the mapping information is obtained based on a predefined ordering of the transmitted measurement values related to the selected K Tx beams, or the mapping information is received through Layer 1, L1 or higher layer signaling, and
wherein the higher layer signaling is configured to correspond to signaling through medium access channel-control element (MAC-CE) and/or radio resource control (RRC) signaling, or is configured to use both MAC-CE and RRC.

13. The client device of claim 1, wherein K represents the number of beams that are selected.

14. The client device of claim 1, wherein the predefined ordering of the transmitted measurement values related to the selected K Tx beams is defined in a standard.

15. The client of claim 1, wherein receiving a downlink signal using the obtained information about the selected K Tx beams and the mapping information comprises selecting the best receive (Rx) beam to receive the downlink signal according to the obtained information about the selected K Tx beams and the mapping information.

* * * * *